US012745126B2

(12) United States Patent
Shao

(10) Patent No.: US 12,745,126 B2
(45) Date of Patent: Sep. 22, 2026

(54) APPARATUSES, SYSTEMS AND METHODS FOR CONTROLLING TRAFFIC IN A CELLULAR NETWORK BASED ON RENEWABLE ENERGY UTILIZATION OF THE CELLULAR NETWORK

(71) Applicant: TOYOTA JIDOSHA KABUSHIKI KAISHA, Toyota (JP)

(72) Inventor: Xiao Shao, Kawasaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 18/436,856

(22) Filed: Feb. 8, 2024

(65) Prior Publication Data

US 2024/0276288 A1 Aug. 15, 2024

(30) Foreign Application Priority Data

Feb. 9, 2023 (JP) ................................ 2023-018520
Nov. 17, 2023 (JP) ................................ 2023-195768

(51) Int. Cl.
*H04W 28/02* (2009.01)
*G06Q 50/06* (2024.01)

(52) U.S. Cl.
CPC ........ *H04W 28/0247* (2013.01); *G06Q 50/06* (2013.01)

(58) Field of Classification Search
CPC .......................... H04W 28/0247; G06Q 50/06
See application file for complete search history.

(56) References Cited

U.S. PATENT DOCUMENTS 12,261,435 B2 * 3/2025 Angerame .............. H02J 3/003
2012/0252525 A1 * 10/2012 Frenger .................. H02J 3/144 455/524
2014/0119254 A1 * 5/2014 Ansari ............. H04W 52/0206 370/311
2014/0256330 A1 9/2014 Liu et al.
(Continued)

FOREIGN PATENT DOCUMENTS

JP 2013038542 A 2/2013
JP 2021189845 A 12/2021
(Continued)

OTHER PUBLICATIONS

English translation of JP 2021-189845 A, published Dec. 13, 2021, 13 pages.
(Continued)

*Primary Examiner* — Alina A Boutah
(74) *Attorney, Agent, or Firm* — Sheppard Mullin Richter & Hampton LLP

(57) ABSTRACT

An information processing method includes: receiving second information from a cellular network, by an information processing device configured to perform a process related to communication through the cellular network, the second information being information that is generated by using first information indicating a status of renewable energy utilization for operation of the cellular network and that is used to control the communication; and controlling, by the information processing device, the communication by using the second information received from the cellular network.

5 Claims, 8 Drawing Sheets

(56) References Cited

U.S. PATENT DOCUMENTS

| | | | | |
|---|---|---|---|---|
| 2022/0216695 | A1* | 7/2022 | Angerame | H02J 3/004 |
| 2024/0073822 | A1 | 2/2024 | Shinohara et al. | |

FOREIGN PATENT DOCUMENTS

| | | | | | |
|---|---|---|---|---|---|
| JP | 2023128870 | A | * | 9/2023 | G06Q 50/06 |
| WO | WO-2021246087 | A1 | * | 12/2021 | G06Q 10/04 |
| WO | 2022137479 | A1 | | 6/2022 | |
| WO | WO-2024162985 | A1 | * | 8/2024 | G06Q 50/06 |

OTHER PUBLICATIONS

Jahid, Abu, et al., "Green Energy Driven Cellular Networks with JT Comp Technique", Physical Communication, vol. 28, Jun. 2018 (Year: 2018), pp. 58-68.

Zheng, Zhongming, et al., "Sustainable Communication and Networking in Two-Tier Green Cellular Networks", IEEE Wireless Communications, vol. 21, Issue No. 4, Aug. 2014 (Year: 2014), pp. 47-53.

3GPP TS 23.288 V18.3.0 (Sep. 2023), Release 18, 2023 (Year: 2023), 40 pages.

English translation of JP 2013-038542 A, published Feb. 21, 2013, Applicant: Nippon Telegraph & Telephone, 15 pages.

* cited by examiner

| Information | Source | Explanation |
| --- | --- | --- |
| UE location | AMF | UE location information (Cell ID) to identify the base station serving the UE |
| Site | OAM | Information on sites (data centers, etc.) related to NFs and base stations that provide services to the UE |
| Supplied renewable energy | OAM, AF | Electricity generated from renewable energy supplied to the site and total amount of electricity |

FIG.7B

| Information | Explanation |
| --- | --- |
| Renewable energy analysis list (1 to maximum value) | |
| Timestamp | Timestamp to be applied to renewable energy ratio |
| Reporting threshold for renewable energy ratio exceedance (Crossed Reporting Threshold) * | A reporting threshold that is met, exceeded, or crossed by the statistical or expected value of the renewable energy ratio KPI. The KPI indicates the proportion of electricity used by renewable energy sources to the total electricity consumption of dedicated communication services in a certain unit of time. |
| * Analysis subsets available in "List of requested analysis subsets" and "Desired level of accuracy for each analysis subset" | |

APPARATUSES, SYSTEMS AND METHODS FOR CONTROLLING TRAFFIC IN A CELLULAR NETWORK BASED ON RENEWABLE ENERGY UTILIZATION OF THE CELLULAR NETWORK

CROSS-REFERENCE TO RELATED APPLICATION

This application claims priority to Japanese Patent Application No. 2023-018520 filed on Feb. 9, 2023 and Japanese Patent Application No. 2023-195768 filed on Nov. 17, 2023, each incorporated herein by reference in its entirety.

BACKGROUND OF THE INVENTION

1. Field of the Invention

The present disclosure relates generally to cellular communication networks, and more particularly to controlling traffic in such networks.

2. Description of Related Art

There is a technique of dynamically distributing data processing according to power generated by renewable energy among a plurality of data centers. Such a technique is disclosed in documents such as Japanese Unexamined Patent Application Publication No. 2021-189845 (JP 2021-189845 A), Green energy driven cellular networks with JT CoMP technique, AbuJahida, Abdullah BinShams, Md. Farhad Hossain, Physical Communication (Volume 28, June 2018, Pages 58-68), and Sustainable communication and networking in two-tier greencellular networks, Zhongming Zheng; Xiaoxia Zhang; Lin X. Cai; Ran Zhang; Xuemin Shen; IEEE Wireless Communications (Volume: 21, Issue: 4, August 2014).

SUMMARY OF THE INVENTION

The present disclosure provides an information processing method and an information processing device that allow renewable energy to be suitably used for communication through a cellular network.

A first aspect of the present disclosure relates to an information processing method. The information processing method includes: acquiring, by an information processing device, first information from at least one first device, the at least one first device being part of a cellular network or connected to the cellular network, the first information being information indicating a status of renewable energy utilization for operation of the cellular network; and enabling, by the information processing device, a second device to perform a process related to communication through the cellular network by: generating, based on the first information, second information to control the communication, and transmitting the second information to the second device.

In the first aspect, the information processing device may generate the second information by using renewable energy information indicating renewable energy available for the operation of the cellular network, the renewable energy information being information predicted based on the first information and information indicating a weather forecast.

In the first aspect, the information processing device may include, in the second information, information prompting to increase communication traffic in the cellular network, when the first information indicates that more renewable energy is available than renewable energy being used for the operation of the cellular network.

In the first aspect, the information processing device may include, in the second information, information prompting to reduce communication traffic in the cellular network, when the first information indicates a decrease in renewable energy available for the operation of the cellular network.

In the first aspect, the information processing device may include, in the second information, timing information, wherein the second device may be configured to perform a process of increasing or reducing the communication traffic in the cellular network according to the timing information.

In the first aspect, the second device may include at least one of the following: a terminal connected to the cellular network, an external server connected to the cellular network, and a device that is part of the cellular network.

In the first aspect, the information processing device may operate as a Network Data Analytics Function (NWDAF) of the cellular network.

In the first aspect, the information processing device may operate as a Network Function (NF) constituting the cellular network.

In the first aspect, the first device may include at least one of a base station connected to the cellular network, an Operation Administration and Maintenance (OAM) terminal connected to the cellular network, and an external server connected to the cellular network.

In the first aspect, the first information may include at least one of information indicating an amount of renewable energy available for the operation of the cellular network and information indicating a utilization rate of renewable energy in the cellular network.

In the first aspect, the communication may be controlled based on the second information when a path for the communication is changed.

A second aspect of the present disclosure relates to an information processing method. The information processing method includes: receiving second information from a cellular network, by an information processing device configured to perform a process related to communication through the cellular network, the second information being information that is generated by using first information indicating a status of renewable energy utilization for operation of the cellular network and that is used to control the communication; and controlling, by the information processing device, the communication by using the second information received from the cellular network.

In the second aspect, the information processing device may control the communication by using renewable energy information indicating renewable energy available for the operation of the cellular network, the renewable energy information being information predicted based on the first information and information indicating a weather forecast.

In the second aspect, the information processing device may increase communication traffic of the cellular network based on the second information including information prompting to increase the communication traffic, when the first information indicates that more renewable energy is available than renewable energy being used for the operation.

In the second aspect, the information processing device may reduce communication traffic of the cellular network based on the second information including information prompting to reduce the communication traffic, when the first information indicates a decrease in renewable energy available for the operation.

In the second aspect, the information processing device may increase or reduce the communication traffic at a timing according to the second information.

In the second aspect, the information processing device may be a terminal connected to the cellular network, an external server connected to the cellular network, or a device constituting the cellular network.

In the second aspect, the information processing device may receive the first information or the second information from a device configured to operate as a Network Data Analytics Function (NWDAF) constituting the cellular network.

In the second aspect, the information processing device may control the communication based on the second information when a path for the communication is changed.

A third aspect of the present disclosure relates to a system comprising one or more hardware processors; and one or more non-transitory machine-readable storage media encoded with instructions that, when executed by the one or more hardware processors, cause the system to perform operations. The operations may include acquiring first information from at least one first device, the at least one first device being part of a cellular network or connected to the cellular network, the first information being information indicating a status of renewable energy utilization for operation of the cellular network. The operations may also include enabling a second device to perform a process related to communication through the cellular network by: generating, based on the first information, second information to control the communication, and transmitting the second information to the second device.

According to the first, second, and third aspects of the present disclosure, it is possible to allow the renewable energy to be suitably used for the communication via the cellular network.

BRIEF DESCRIPTION OF THE DRAWINGS

Features, advantages, and technical and industrial significance of exemplary embodiments of the invention will be described below with reference to the accompanying drawings, in which like signs denote like elements, and wherein:

FIG. 5 is a flowchart showing an example of a process of the information processing device operating as a Network Data Analytics Function (NWDAF) according to some embodiments of the disclosed technology;

FIG. 7A shows data collected from NF and OAM related to renewable energy ratio analysis;

FIG. 7B is a table showing an example of renewable energy ratio analysis.

DETAILED DESCRIPTION OF EMBODIMENTS

Figure 1A:
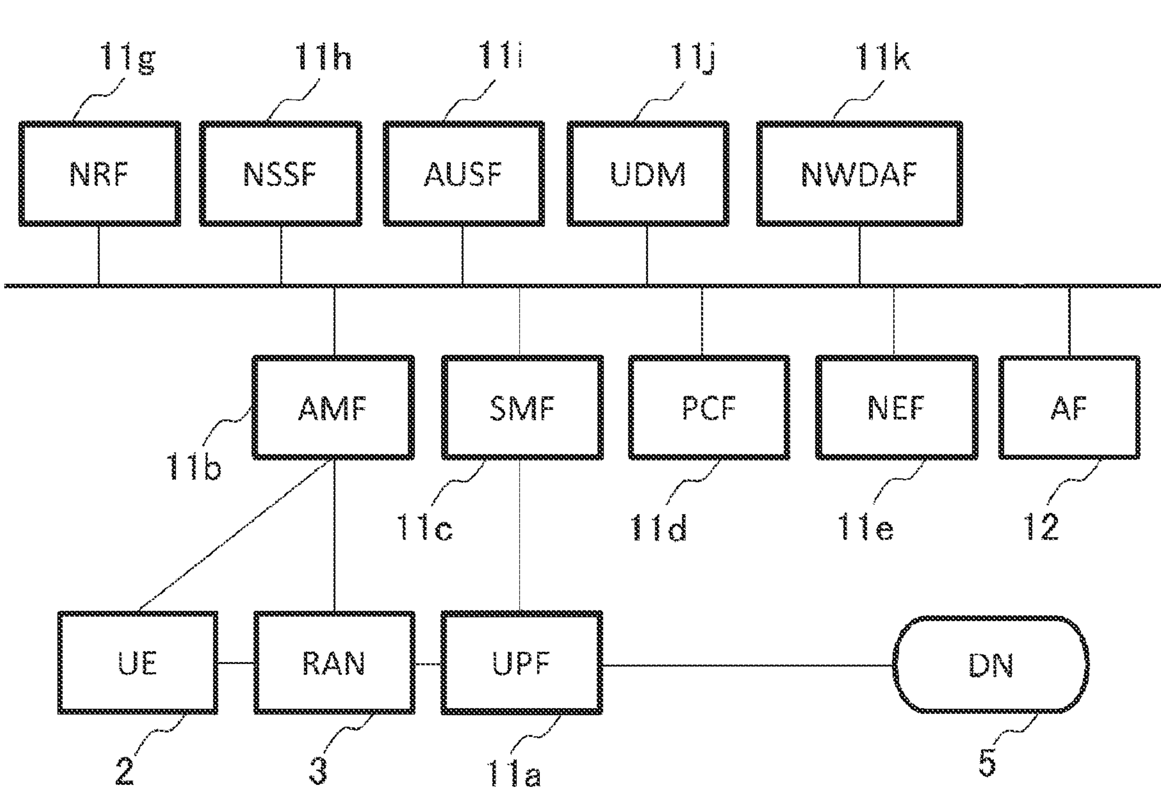
FIG. 1A is an illustration of a fifth generation mobile communication system (5G) according to some embodiments of the disclosed technology.

In an information processing method according to an embodiment, an information processing device performs the following: (i) acquire first information from at least one of a plurality of first devices constituting a cellular network or connected to the cellular network, the first information being information on utilization of renewable energy for operation of the cellular network, and (ii) transmit second information to a second device configured to perform a process related to communication through the cellular network, the second information being information that is generated using the first information and that is used to control communication traffic.

According to the information processing method, the second device controls the communication traffic using the second information. It is therefore possible to increase the communication traffic as the available amount of renewable energy increases, and to reduce the communication traffic as the available amount of renewable energy decreases. In other words, by relaxing or tightening the limitation on communication according to the available amount of renewable energy, the renewable energy can be suitably consumed for the operation of the cellular network.

For example, the cellular network may be a 5G network. However, the cellular network may be a network other than the 5G network. The renewable energy includes natural energy such as sunlight, solar heat, wind, tide, and ground heat, biomass energy, and recycled energy such as energy from waste.

The information processing device may be a device that operates as a Network Data Analytics Function (NWDAF) in the cellular network. However, the information processing device may be a device other than this. The first device may be various devices in the cellular network such as a device that operates as a Network Function (NF). The first device may include a base station, an Operation Administration and Maintenance (OAM) terminal, and/or an external server that are connected to the cellular network. The Network Functions (NFs) may include, for example, User Plane Function (UPF), Session Management Function (SMF), Access and Mobility Management Function (AMF), Policy Control Function (PCF), and/or Unified Data Management (UDM). The second device may be a device that performs a process related to the communication via the cellular network. The second device may be a device that controls the communication traffic through the cellular network. The second device may be, for example, a terminal such as user equipment (UE), an external device connected to the cellular network (such as an external server), or a device constituting the cellular network (e.g., a device operating as an NF).

The first information is, for example, information indicating the amount of renewable energy available for the operation of the cellular network. Alternatively, the first information may be the utilization rate of the renewable energy in the cellular network (i.e., the ratio of the renewable energy used to the total energy consumed for the operation (percentage of the renewable energy in the consumed energy)). However, the first information may be information other than these pieces of information.

For example, the second information may be a predicted value of the amount of renewable energy that will be available in the future or a predicted value of the utilization rate of the renewable energy in the future. That is, the second information may include predicted information indicating the renewable energy available for the operation of the cellular network predicted based on the first information. The predicted information may be generated based on information included in the first information and indicating a weather forecast. That is, the information processing device may generate, based on the information indicating a weather forecast, the second information indicating the predicted amount of renewable energy that will be available in the future or the predicted utilization rate of the renewable energy in the future.

The second information may be information indicating to increase or decrease the communication traffic (i.e., to relax or tighten the limitation on communication) according to the amount of renewable energy or the utilization rate of the renewable energy. That is, in the information processing method, the information processing device or the second device having received the first information may generate the second information including information prompting to increase the communication traffic, when the first information indicates that more renewable energy is available than renewable energy currently being used for the operation of the cellular network. The information processing device or the second device having received the first information may generate the second information including information prompting to reduce the communication traffic, when the first information indicates a decrease in renewable energy available for the operation of the cellular network. The second device may be configured to increase or reduce the communication traffic at a timing according to the second information.

An information processing device according to some embodiments will be described with reference to the drawings. The configuration of these embodiment is illustrative, and the present disclosure is not limited to this configuration of the embodiments.

Configuration of Information Processing System

Figure 1B:
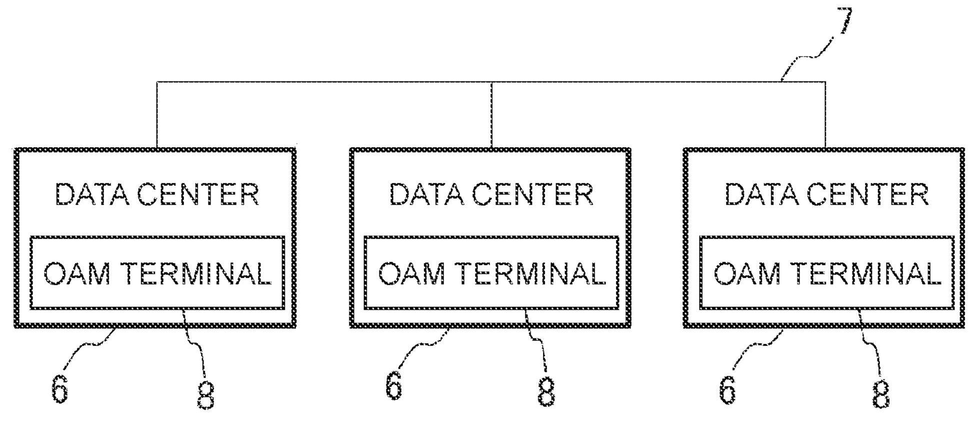
FIG. 1B is an illustration of the fifth generation mobile communication system (5G) according to some embodiments of the disclosed technology.

FIG. 1A shows components (i.e., constituent elements) of a fifth generation mobile communication system (5G network) according to some embodiments of the disclosed technology. In FIGS. 1A and 1B, user equipment (UE) 2 is a terminal of a user (subscriber). A radio access network (RAN) 3 is an access network to a 5G core network (5GC). The RAN 3 may include a base station (gNB) (not shown). A 5G network may include a 5G core network (5GC), the RAN 3, the UE 2, a Data Network (DN) 5, and an Application Function (AF) 12 connected to the 5G network. Each of NFs 11*a* to 11*e* and 11*g* to 11*k* is a function implemented by one or more computers (information processing devices) executing a program.

The 5GC is composed of a collection of components each having a predetermined function called a network function (NF). FIGS. 1A and 1B show the following NFs 11 of the 5GC. In FIG. 1A, the NFs 11 are shown by bold rectangles.

User Plane Function (UPF) 11*a*
Access and Mobility Management Function (AMF) 11*b*
Session Management Function (SMF) 11*c*
Policy Control Function (PCF) 11*d*
Network Exposure Function (NEF) 11*e*
Network Repository Function (NRF) 11*g*
Network Slice Selection Function (NSSF) 11*h*
Authentication Server Function (AUSF) 11*i*
Unified Data Management (UDM) 11*j*
Network Data Analytics Function (NWDAF) 11*k*

Figure 2:
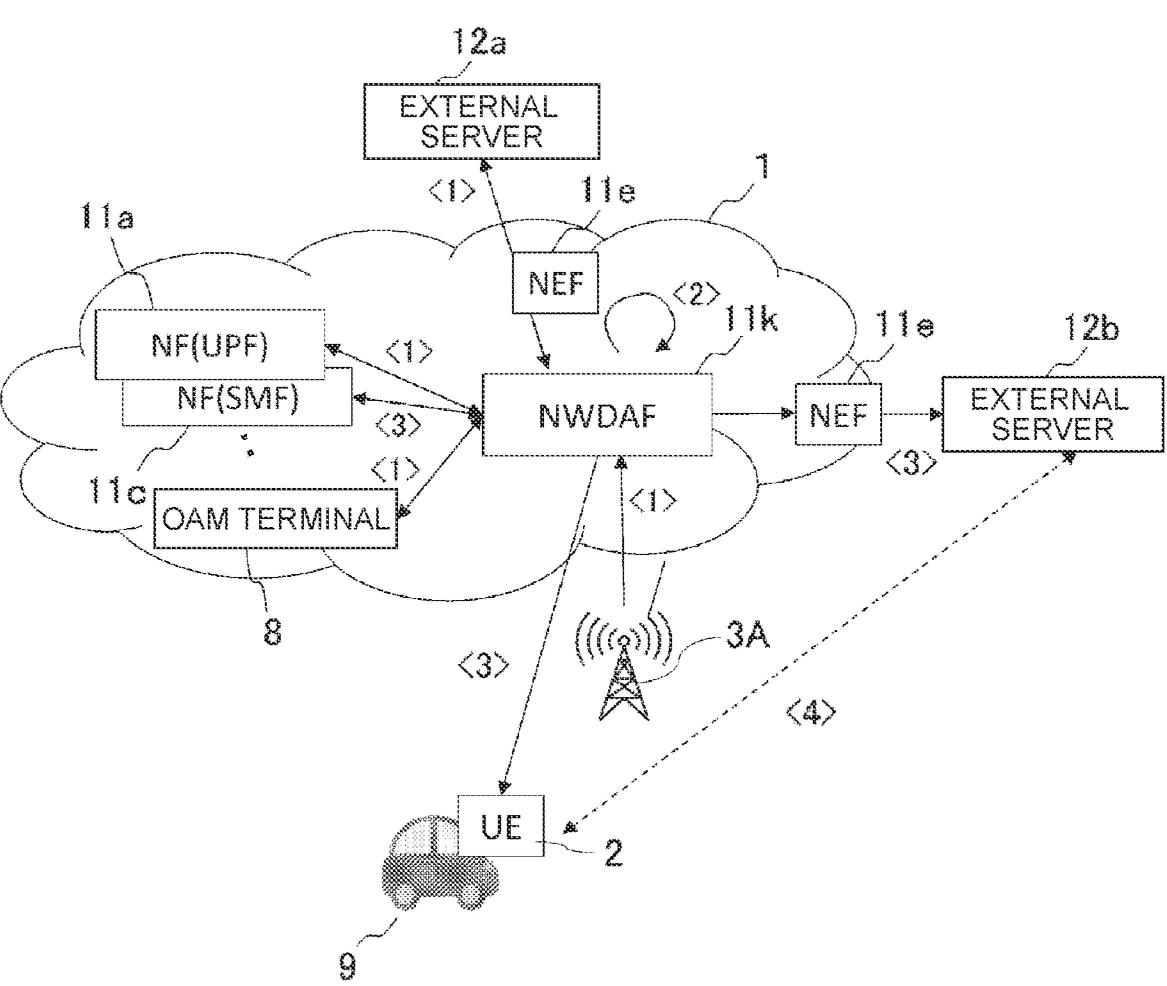
FIG. 2 illustrates an information processing system according to some embodiments of the disclosed technology.

The UPF 11*a* may perform routing and forwarding, inspection, and quality of service (QoS) handling of user packets (i.e., user plane packets that are transmitted and received by the UE 2). The AMF 11*b* is a serving device for the UE 2 in a 5GC 1 (FIG. 2). The AMF 11*b* may accommodate the RAN 3 and may perform subscriber authentication, location (i.e., mobility) management for the UE 2, etc. The UDM 11*j* may provide subscriber information or may acquire, register, delete, and change the state of the UE 2.

The SMF 11*c* may manage Protocol Data Unit (PDU) sessions and may control the UPF 11*a* to perform QoS control and policy control. A PDU session is a virtual communication channel for data transfer between the UE 2 and the DN 5. The DN 5 is a data network outside the 5GC (such as the Internet).

The PCF 11*d* may perform QoS control, policy control, charging control, etc. under the control of the SMF 11*c*. In the QoS control, communication quality control such as priority packet transfer may be performed. In the policy control, communication control such as QoS, and packet transfer handling, charging, etc. based on network or subscriber information may be performed. The NEF 11*e* may serve to mediate communication between an external node such as the AF 12 and a node within a control plane. The AF 12 is an application server (external server) outside the 5GC.

The NRF 11*g* may store and manage information on the NFs (e.g., AMF, SMF, UPF, etc.) within the 5GC 1 (FIG. 2). The NRF 11*g* may reply to an inquiry source with a plurality of candidate NFs in response to an inquiry regarding the NF desired to be used.

The NSSF 11*h* may have a function to select a network slice to be used by a subscriber from network slices created by network slicing. A network slice is a virtual network having specifications according to the intended use.

The AUSF 11*i* is a subscriber authentication server that may perform subscriber authentication under the control of the AMF 11*b*. The UDM 11*j* may store subscriber related information. The NWDAF 11*k* may have a function to collect and analyze data from each NF 11, an Operations, Administration, and Maintenance (OAM) terminal 8 (FIG. 2), an external server 12*a* (FIG. 2), etc. The NWDAF 11*k* is an NF that may provide network analysis information.

Each NF forming the 5GC is composed of one or more information processing devices (servers, network devices, etc.). The information processing devices are installed in a special building called a data center. The data center is also called an exchange. As shown in FIG. 1B, one or more data centers 6 are located in a 5GC communication area (three data centers 6 are shown as an example in FIG. 1B), and the data centers 6 are connected by a communication line 7. Each data center 6 is provided with an OAM terminal 8. Operations, Administration, and Maintenance (OAM) terminal 8 has a function to operate, administer, and maintain the network (5GC).

A plurality of NFs of the same type may be prepared in the 5GC. For example, an NF 11 may be prepared for each data center 6. Alternatively, one NF 11 may be shared between or among the data centers 6. Alternatively, a plurality of NFs 11 of the same type may be configured in one data center 6. The number of data centers 6, the number of NFs 11, and the correspondence between the NFs 11 and the data centers 6 can be set as appropriate.

FIG. 2 illustrates an information processing system according to some embodiments of the disclosed technology. The 5GC 1 shown in FIG. 2 has the NFs 11 (11*a* to 11*e* and 11*g* to 11*k*) shown in FIG. 1A. The UE 2 can wirelessly connect with the base station 3A of the RAN 3 to transfer data to and from a communication partner (DN 5) via the 5GC 1. In the example shown in FIG. 2, the UE 2 is installed in a vehicle 9. However, the UE 2 need not necessarily be in-vehicle equipment. The vehicle 9 may be a vehicle that is driven by a person or an autonomous vehicle.

In some embodiments, part of the power for operating the 5G network (5GC 1 and RAN 3), that is, for operating the information processing devices forming the 5G network, can be supplied from renewable energy.

The NWDAF (data analysis unit) 11*k* collects and analyzes information indicating the status of renewable energy utilization in the entire 5G network or part of the 5G network (e.g., utilization status information, an example of the first information). The utilization status information of the renewable energy may be either or both of the available amount of renewable energy and the utilization rate of the renewable energy (i.e., percentage of the power from the renewable energy in the power used). The NWDAF 11*k* may transmit information obtained by the analysis (an example of the second information) to a device that may perform a process related to communication (an example of the second device) through the 5G network.

The NWDAF 11*k* can acquire the utilization status information from at least one of the following examples of the first device: the NFs 11 (e.g., UPF 11*a*, SMF 11*c*, AMF 11*b*, PCF 11*d*, UDM 11*j*, etc.), the base station 3A, and the external server 12 (at <1> in FIG. 2). The types of the NFs 11 are not limited to those illustrated above, and may be new NFs.

For example, the utilization status information may be acquired by receiving utilization status information that is periodically sent from a provider device that provides utilization status information. Alternatively, the NWDAF 11*k* may transmit a request to provide utilization status information, and may acquire utilization status information sent from a provider in response to the request. The number of provider devices and the range (unit) of utilization status information possessed by each provider device can be set as appropriate.

The range of the utilization status information may be the entire 5G network or a part of the 5G network (e.g., in unit of the NFs). The provider of the utilization status information may be the OAM terminal 8. Information indicating the status of renewable energy utilization in each data center (i.e., exchange) 6 and the information processing device installed (i.e., accommodated) in the data center 6 (an example of the information processing device, NF 11) can be acquired from the OAM terminal 8. In this way, the utilization status and the range (i.e., area) of communication control can be set as appropriate.

The utilization status information may be information indicating the utilization status in the entire 5G network, or may be information indicating the utilization status in part of the 5G network. The number of provider devices may be one, or may be two or more. The information indicating the utilization status in the entire 5G network may be obtained by aggregating pieces of utilization status information (each indicating the utilization status in part of the 5G network) collected from a plurality of provider devices by the NFDAF 11*k*.

The NWDAF 11*k* can collect information on weather forecasts (e.g., predictions of the amount of solar radiation, wind volume, etc.) from the external server 12*a* connected to the 5GC via the NEF 11*e*. The external server 12*a* is an example of the first device, and the weather forecast information is an example of the first information.

The NWDAF 11*k* uses (e.g., analyzes) the collected information (first information) to generate information indicating the utilization status (e.g., the available amount and utilization rate of the renewable energy) at a current point in time and information indicating a prediction of the utilization status at a future point in time (at <2> in FIG. 2). The number of future points in time (e.g., predicted points in time) and the length of time between the predicted points in time (e.g., elapsed time from the current point in time) can be set as appropriate. However, in the case where the available amount and utilization rate of the renewable energy in the utilization status at the current point in time are calculated and no prediction is made, the acquisition of the weather forecast information may be omitted.

The NWDAF 11*k* may transmit information indicating either or both of the utilization status at the current point in time and the utilization status at a future point in time (an example of the second information) to a predetermined destination (at <3> in FIG. 2). The predetermined destination is, for example, at least one of the following: an external server 12*b* connected to the NADAF 11*k* via the NEF 11*e*, the UE 2, and a predetermined NF 11. Each of the external server 12*b*, the UE 2, and the predetermined NF 11 is an example of a device that performs a process related to communication. The NF 11 may be, for example, the UPF 11*a*, the SMF 11*c*, the AMF 11*b*, the PCF 11*d*, or the UDM 11*j*, etc., but is not limited to these.

Based on the information indicating the utilization status at the current point in time or the future point in time, the NWDAF 11*k* may transmit, to the predetermined destination, information prompting to increase or reduce the communication traffic through the 5G network. This information may include information specifying a time period during which the communication traffic is to be increased or reduced.

The transmission of the second information can be performed by either the Subscribe-Notify method or the Request-Response method (as defined in Chapter 6.1 of TS23.288). When the Subscribe-Notify method is used, the transmission of the information prompting to increase the communication traffic (an example of the second information) is performed when, for example, the available amount or utilization rate of the renewable energy becomes higher than a first threshold. The transmission of the information prompting to reduce the communication traffic (an example of the second information) is performed when, for example, the available amount or utilization rate of the renewable energy becomes lower than a second threshold. The first threshold and the second threshold may be the same value or may be different values. Different first threshold values and different second threshold values may be prepared for the available amount and the utilization rate. When the Request-Response method is used, the NWDAF 11*k* may transmit the second information to a recipient in response to a request for the second information from the recipient.

The external server 12*b* and the UE 2 can control communication based on the second information (at <4> in FIG. 2). For example, the external server 12*b* that has received the second information may increase, in the specified time period, the transmission rate of packets to be transmitted to a downlink, when the received information is the information prompting to increase the communication traffic. Alternatively, the UE 2 that has received the second information may increase, in the specified time period, the transmission rate of packets to be transmitted to an uplink.

Increasing the transmission rate increases the number of packets transmitted per unit time. This increases the load of a packet transfer process in packet transfer paths (e.g., base station 3A, UPF 11*a*, and NEF 11*e*) in the 5G network, and increases power consumption. The renewable energy can thus be suitably consumed for the packet transfer. When the second information is transmitted, the transmission rates of packets from the external server 12*b* and the UE 2 are also reduced. Packet transmission may be stopped. This reduces the load of the packet transfer process in the 5G network, and reduces consumption of energy other than the renewable energy. Increasing or reducing the transmission rate (e.g., stopping or resuming communication) in this manner allows efficient consumption of the renewable energy. The information prompting to increase or reduce the communication traffic may be sent to the NF 11 (e.g., PCF 11*d*, SMF 11*c*, UPF 11*a*, etc.).

Configuration of Information Processing Device and Terminal

Figure 3A:
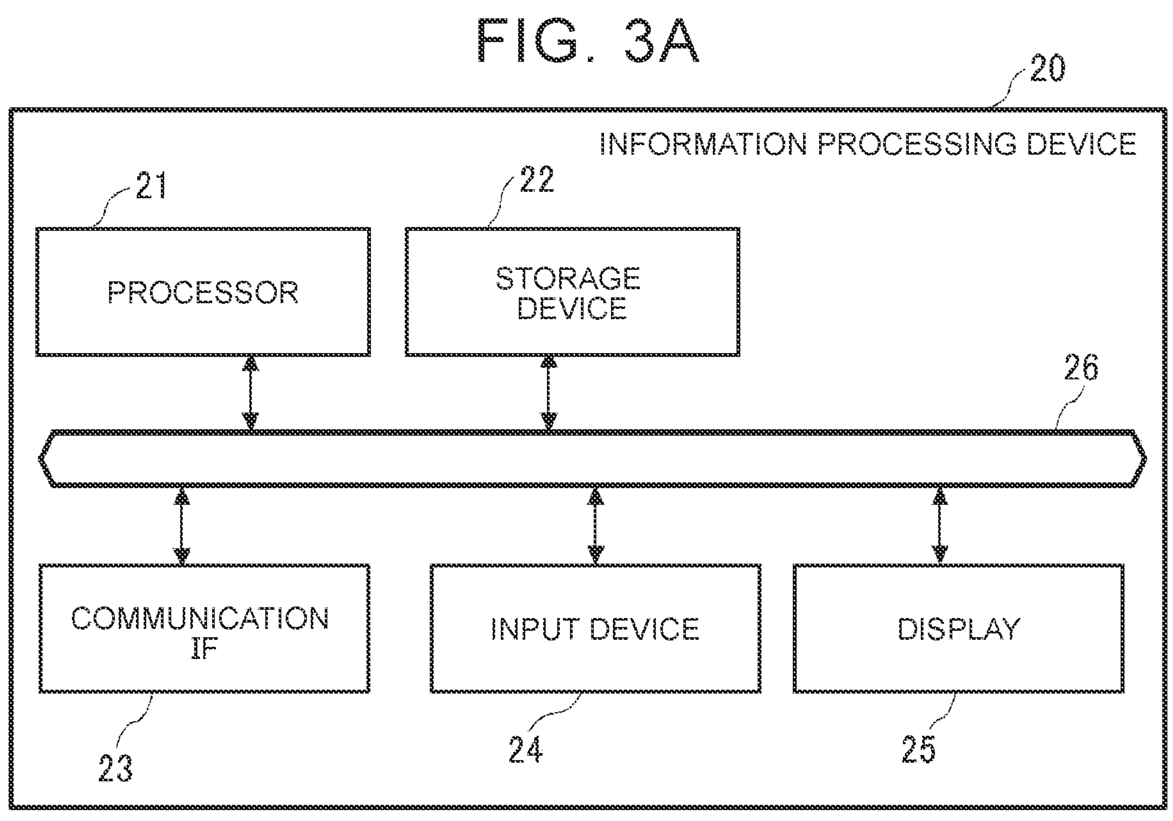
FIG. 3A shows a configuration example of an information processing device according to some embodiments of the disclosed technology.

FIG. 3A shows a configuration example of an information processing device that can operate as each of the NFs 11*a* to 11*e* and 11*g* to 11*k*, the OAM terminal 8, and the external servers 12*a*, 12*b* according to some embodiments of the disclosed technology. In FIG. 3A, an information processing device 20 may be a dedicated or general-purpose information processing device (e.g., a computer) such as a personal computer (PC), a workstation (WS), or a server machine. However, the information processing device 20 may be a collection of one or more computers (cloud).

The information processing device 20 may include a processor 21 as a processing unit or a control unit (e.g., a controller), a storage device 22, a communication interface 23 (communication IF 23), an input device 24, and a display 25. These components of the information processing device 20 may be connected to each other via a bus 26.

The storage device 22 may include a main storage device and an auxiliary storage device. The main storage device may be used as at least one of the following: a storage area for programs and data, a loading area for programs, a work area for programs, and a buffer area for communication data. The main storage device may be a random access memory (RAM) or a combination of a RAM and a read-only memory (ROM). The auxiliary storage device may be used as a storage area for data and programs. A nonvolatile storage medium may be used as the auxiliary storage device. The non-volatile storage medium may be, for example, a hard disk, a solid state drive (SSD), a flash memory, or an electrically erasable programmable read-only memory (EEPROM). The storage device 22 may include a drive device for a disk recording medium.

The communication IF 23 may be a circuit that performs a communication process. For example, the communication IF 23 may be a network interface card (NIC). The communication IF 23 may be a wireless communication circuit that performs wireless communication (5G, wireless local area network (LAN) (Wi-Fi), Bluetooth Low Energy (BLE), etc.). The communication IF 23 may be a combination of a circuit that performs a wired communication process and a wireless communication circuit.

The input device 24 may include keys, buttons, a pointing device, a touch panel, etc., and is used to enter information. The display 25 may be, for example, a liquid crystal display etc., and displays information and data.

The processor 21 performs various processes by executing various programs stored in the storage device 22. As the processor 21 executes the programs stored in the storage device 22, the information processing device 20 may operate as each of the NFs 11*a* to 11*e* and 11*g* to 11*k*, the OAM terminal 8, and the external servers 12*a*, 12*b*.

Figure 3B:
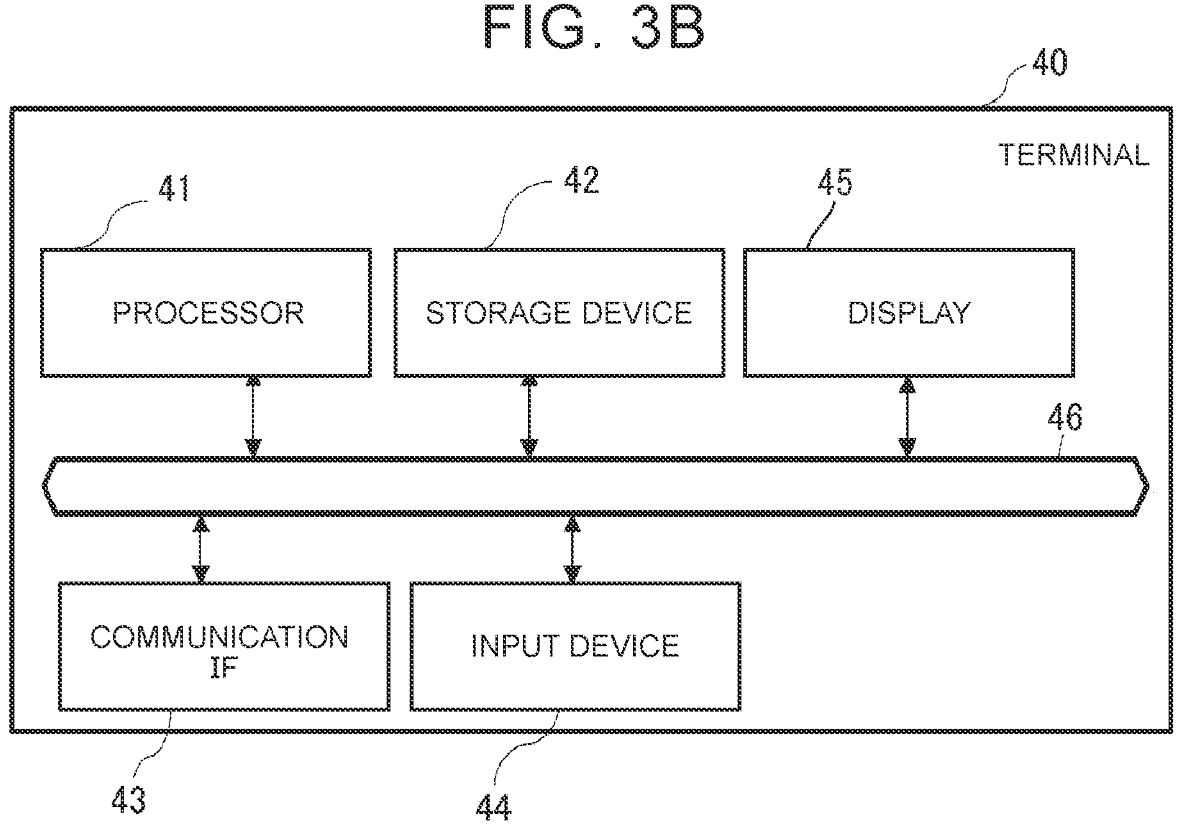
FIG. 3B shows a configuration example of a terminal according to some embodiments of the disclosed technology.

FIG. 3B shows a configuration example of a terminal 40 that can operate as the UE 2 according to some embodiments of the disclosed technology. The terminal 40 may include a processor 41, a storage device 42, a communication interface 43 (communication IF 43), an input device 44, and a display 45. These components of the terminal 4 may be connected to each other via a bus 46. The same configurations as those of the processor 21, the storage device 22, the communication IF 23, the input device 24, and the display 25 may be used for the processor 41, the storage device 42, the communication IF 43, the input device 44, and the display 45. Therefore, description of these components will be omitted.

The processors 21, 41 may be, for example, central processing units (CPUs). The CPU is also referred to as microprocessor unit (MPU). The processors 21, 41 may have a single processor configuration or a multiprocessor configuration. A single physical CPU connected by a single socket may have a multicore configuration. The processors 21, 41 may include arithmetic devices having various circuit configurations, such as a digital signal processor (DSP) or a graphics processing unit (GPU). The processors 21, 41 may have a configuration that cooperates with at least one of the following: an integrated circuit (IC), other digital circuits, and an analog circuit. The integrated circuit may include a large scale integration (LSI) circuit, an application-specific integrated circuit (ASIC), and a programmable logic device (PLD). The PLD may include, for example, a field-programmable gate array (FPGA). The processors 21, 41 may also include, for example, a microcontroller (MCU), a system-on-a-chip (SoC), a system LSI circuit, or a chipset.

Examples of Process

Figure 4:
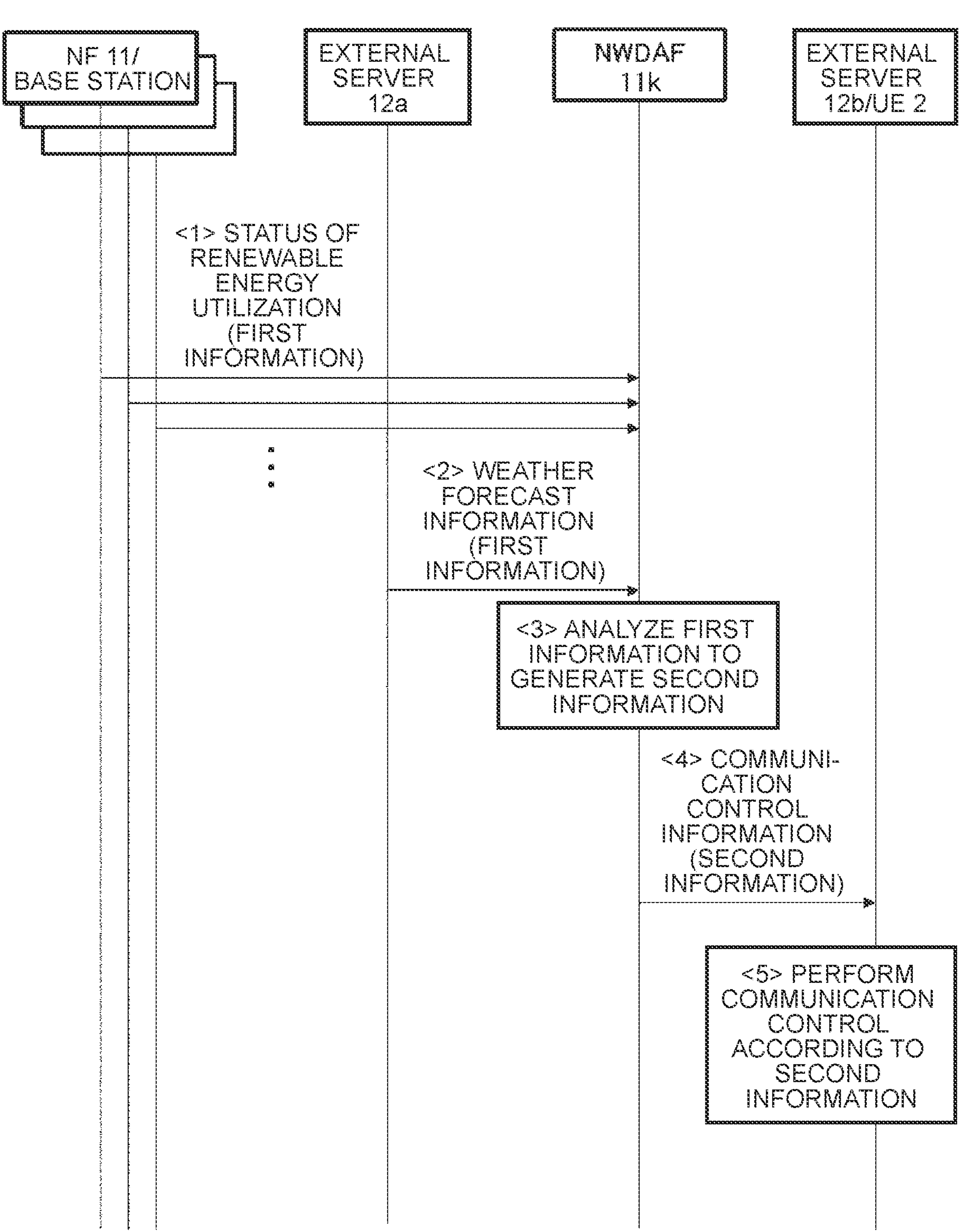
FIG. 4 is a sequence diagram of a communication traffic control method according to some embodiments of the disclosed technology.

FIG. 4 is a sequence diagram showing an example of a process in the information processing system according to some embodiments of the disclosed technology. Each of a predetermined NF 11 and the base station 3A in the 5GC 1 periodically may transmit information indicating the status of renewable energy utilization held (stored) in the predetermined NF 11 or the base station 3A to the NWDAF 11*k* (at <1> in FIG. 4). The transmission of the utilization status information may be performed in response to a request from the NWDAF 11*k*.

The external server 12*a* may periodically transmits the weather forecast information held (i.e., stored) therein to the NWDAF 11*k* (at <2> in FIG. 4). The transmission of the weather forecast information may be performed in response to a request from the NWDAF 11*k*. In the case where no prediction is made based on the weather forecast information, reception of the weather forecast information may be omitted.

The NWDAF 11*k* may analyze the utilization status information and the weather forecast information to generate the second information (at <3> in FIG. 4). For example, the NWDAF 11k may generates communication control information (e.g., information prompting to increase the communication traffic in a predetermined time period) from the utilization status information and the weather forecast information.

The NWDAF 11k may transmit the communication control information to the external server 12b and the UE 2 (at <4> in FIG. 4). Each of the external server 12b and the UE 2 may perform communication control based on the communication control information (at <5> in FIG. 4). For example, the communication control information may include information indicating to remove limitations on data types (e.g., prompting to increase the communication traffic) in areas and time periods in which a sufficient amount of renewable energy is available. In this case, the external server 12b and the UE 2 may transmit all types of data. On the other hand, the communication control information can include information indicating to transmit low-delay data and to stop transmission of data other than the low-delay data (e.g., prompting to reduce the communication traffic) in areas and time periods in which there is not enough renewable energy available. In this case, the external server 12b and the UE 2 may transmit only low-delay data.

In an example of the configuration for the communication control, a threshold for the available amount of renewable energy may be set in advance. When the available amount is larger than the threshold, the communication control information may be transmitted so that each of the external server 12b and the UE 2 may transmit packets without limitation. When the available amount is less than the threshold, a limitation may be set on the packet transmission. In another example of the configuration for the communication control, the utilization rate of the renewable energy may be divided into several stages and the types of data that can be transmitted may be defined for each stage, so that the type of data transmission to be performed may be determined according to the utilization rate.

In still another example of the configuration for the communication control, the NWDAF 11k may transmit the communication control information when the base station 3A, the UPF 11a, etc. are changed (e.g., the communication path is changed) due to a handover of the UE 2 etc.

The NWDAF 11k may use a location information prediction function to find the base station 3A and the UPF 11a that are to be used by the UE 2 in the future and may use them for the communication control in the future.

Figure 5:
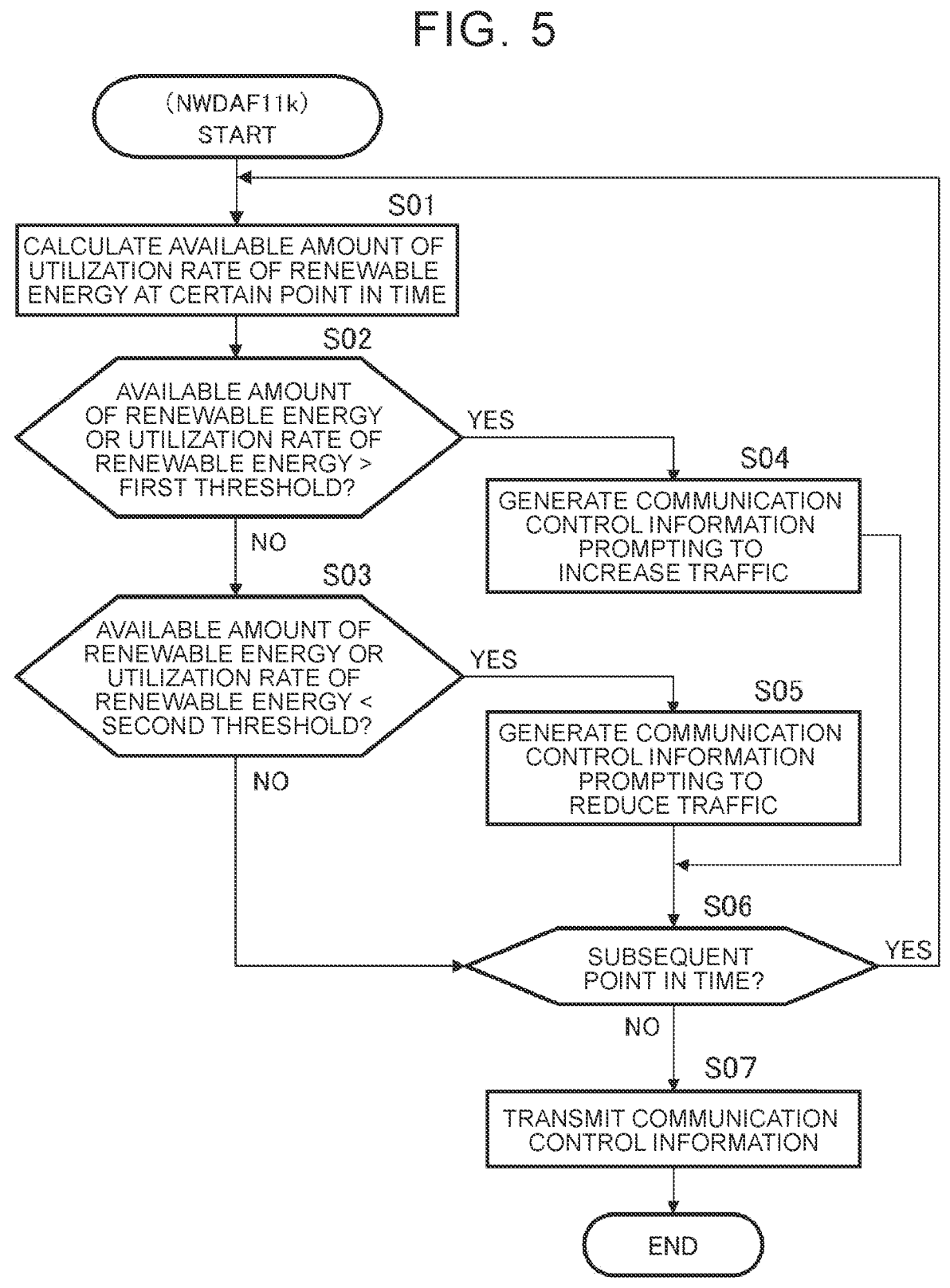

FIG. 5 is a flowchart showing an example of a process of the information processing device 20 operating as the NWDAF 11k according to some embodiments of the disclosed technology. FIG. 5 shows an example of the analysis process in the NWDAF 11k (at <3> in FIG. 4). The process shown in FIG. 5 may be performed by the processor 21 of the information processing device 20.

In step S01, the processor 21 may calculate information indicating the available amount or utilization rate (i.e., utilization status) of the renewable energy at a certain point in time. The certain point in time may refer to a current point in time and one or more future points in time, and the number of future points in time may be set in advance. In the present embodiment, it is set to predict 30 minutes and one hour from the current point in time. In the first step S01, information indicating the utilization status at the current point in time may be calculated.

In step S02, the processor 21 may determine whether the value indicating the available amount or utilization rate of the renewable energy may be higher than the first threshold (i.e., more than the first threshold). When it is determined that the value indicating the available amount or utilization rate of the renewable energy is higher than the first threshold, the process then proceeds to step S04. Otherwise, the process proceeds to step S03.

In step S03, the processor 21 may determine whether the value indicating the available amount or utilization rate of the renewable energy is lower than the second threshold (i.e., less than the second threshold). When it is determined that the value indicating the available amount or utilization rate of the renewable energy is lower than the second threshold, the process proceeds to step S05. Otherwise, the process proceeds to step S06.

In step S04, the processor 21 may generate communication control information prompting to increase the communication traffic in a time period including the certain point in time, and the process then proceeds to step S06. The communication control information can include, for example, information indicating to increase or maintain the transmission rate in this time period, or information indicating to resume communication.

In step S05, the processor 21 may generate communication control information prompting to reduce the communication traffic in a time period including the certain point in time, and the process then proceeds to step S06. The communication control information may include, for example, information indicating to reduce the transmission rate or temporarily stop communication in this time period.

In step S06, the processor 21 may determine whether there is a subsequent point in time for which steps S01 to S05 should be performed (in the present embodiment, 30 minutes later and one hour later). When it is determined that there is a subsequent point in time, the process returns to step S01. Otherwise, the process proceeds to step S07. When the process returns to step S01, a predicted value of the available amount or utilization rate of the renewable energy at the subsequent point in time (e.g., 30 minutes from the current point in time) is calculated based on the weather forecast information.

In step S07, the processor 21 may transmit the communication control information for each point in time to a predetermined destination (e.g., either or both of the external server 12b and the UE 2). Thereafter, the process shown in FIG. 5 ends.

Figure 6:
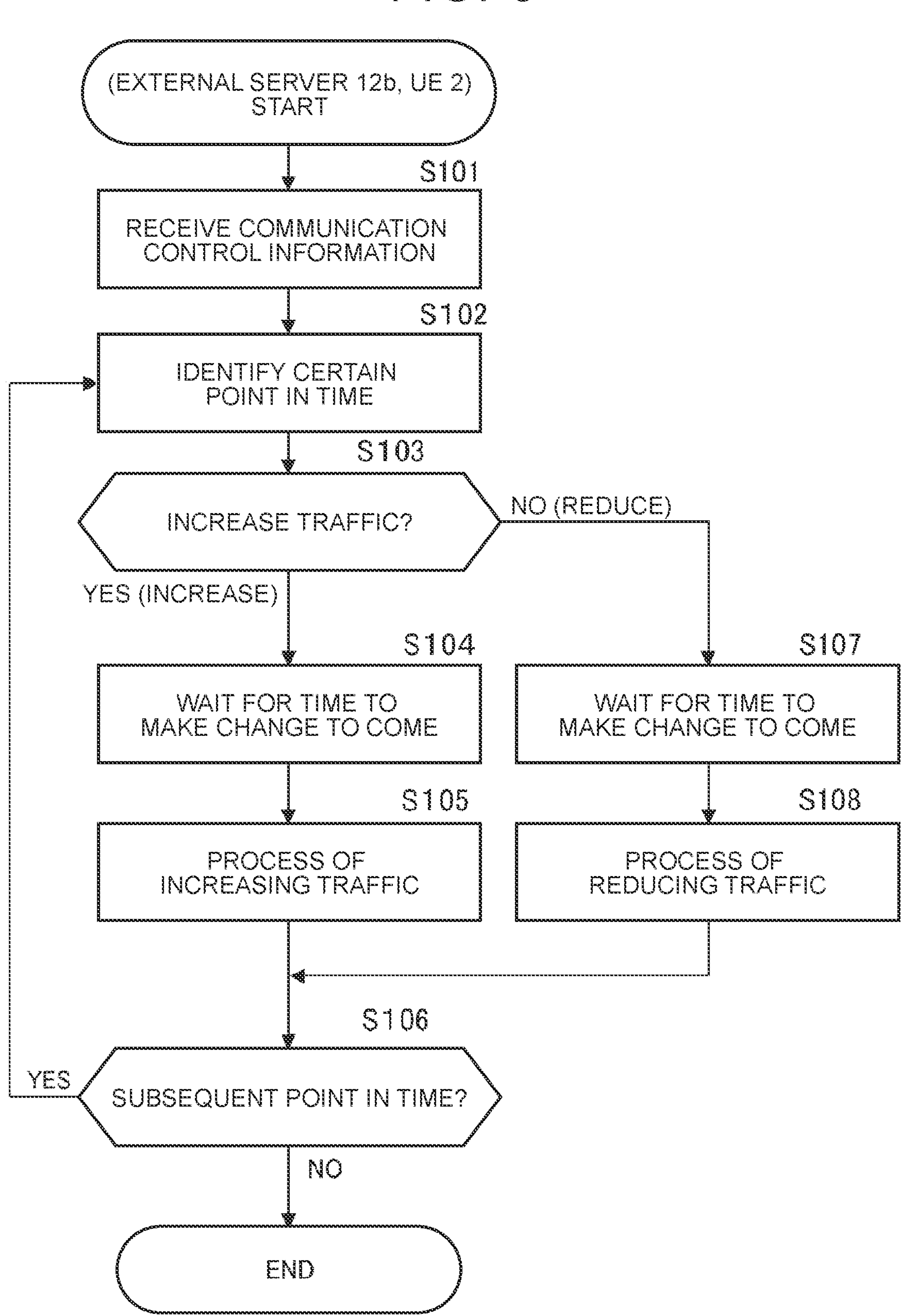
FIG. 6 is a flowchart showing an example of a process of the information processing device or terminal operating as an external server or user equipment (UE) according to some embodiments of the disclosed technology.

FIG. 6 is a flowchart showing an example of a process of the information processing device 20 operating as the external server 12b and the terminal 40 operating as the UE 2 according to some embodiments of the disclosed technology. FIG. 6 shows an example of the communication control in the external server 12b or the UE 2 (<5> in FIG. 4). The process shown in FIG. 6 may be performed by the processor 21 of the information processing device 20 (external server 12b) or the processor 41 of the terminal 40 (UE 2). The following description illustrates the process that is performed by the processor 21 of the information processing device 20. The same applies to the process that is performed by the processor 41.

In step S101, the processor 21 receives the communication control information. In step S102, the certain point in time included in the communication control information is identified. In the present embodiment, the processor 21 may identify the current point in time, 30 minutes from the current point in time, and one hour from the current point in time. The current point in time is identified in the first S102.

In step S103, it is determined whether the communication control for the point in time identified in step S102 is to increase the communication traffic. When it is determined that the communication control is to increase the communication traffic, the process proceeds to step S104. Otherwise (when it is determined that the communication control is to reduce the communication traffic), the process proceeds to step S107.

In step S104, the processor 21 may wait for the time to make a change to come. Namely, the processor 21 may wait for the current point in time to reach the start time of the time period corresponding to the point in time identified in step S102.

In step S105, the processor 21 may perform a process of increasing the communication traffic by increasing the transmission rate of packets, removing limitations on types of packets that can be transmitted, etc. At this time, when the transmission rate has reached its upper limit or when the limitations have already been removed, the transmission rate or the state in which the limitations have been removed may be maintained. The process then proceeds to step S106.

In step S106, the processor 21 may determine whether there is a subsequent point in time for which steps S102 to S108 should be performed (in the present embodiment, 30 minutes later and one hour later). When it is determined that there is a subsequent point in time, the process returns to step S102. Otherwise, the process of FIG. 6 ends. When the process returns to step S102, the subsequent point in time (e.g., 30 minutes from the current point in time) may be identified, and step S103 and the subsequent steps may be performed.

In step S107, the processor 21 may wait for the time to make a change to come. Namely, the processor 21 may wait for the current point in time to reach the start time of the time period corresponding to the point in time identified in step S102.

In step S108, the processor 21 may perform a process of reducing the communication traffic by reducing the transmission rate of packets, limiting types of packets that can be transmitted (e.g., tightening the limitations), temporarily stopping transmission of packets, etc. At this time, when the transmission rate has reached its lower limit, when the limitations have already been placed, or when transmission of packets has been temporarily stopped, the transmission rate or the state in which the limitations have been placed or transmission of packets have been temporarily stopped may be maintained. The process then proceeds to step S106.

Functions and Effects of Some Embodiments

According to some embodiments, the NWDAF 11*k* as the information processing device may acquire (i.e., receive) information on the status of renewable energy utilization from the NF 11 etc. as the first device. The NWDAF 11*k* may generate communication control information from the utilization status information and may transmit the communication control information to the external server 12*b* and the UE 2 as the second device. By performing communication control based on the communication control information, the external server 12*b* and the UE 2 can increase or reduce the communication traffic through the 5G network, so that the renewable energy can be suitably used.

According to the embodiment, the NWDAF 11*k* can acquire weather forecast information from the external server 12*a* and obtain a prediction of the status of renewable energy utilization (available amount or utilization rate of the renewable energy) at a future point in time. Accordingly, the communication traffic can be controlled based not only on the current utilization status but also on the utilization status in the future, so that the renewable energy can be suitably used.

Next, another embodiment of the invention will be described below. Since this another embodiment has common features with the embodiment described above, differences will be mainly explained, and explanation of the common features will be omitted. The information processing method according to the other embodiment includes receiving, by information processing apparatus, a request from a requestor for analysis regarding the use of renewable energy relating to a specific unit of network management in a cellular network. The information processing method also includes transmitting information indicating the results of analysis regarding the use of renewable energy to a recipient of the information.

The cellular network is, for example, 5G network, 6G network, or the like. The specific unit of network management is, for example, a specific site, a specific network slice, a specific NF (Network Function), a specific PDU (Protocol Data Unit) session, or a specific UE. The specific NF may be UPF or SMF. The unit of network management can be specified or designated, for example, by specifying UE, the site to which the UE belongs (uses), and the NF or PDU session (allocated to the UE) used by the UE for communication. Conversely, it is also possible to specify a site, network slice, NF or PDU session, and identify one or more UEs that use these for communication as specific UE. However, the specific method may be other than the above. A specific unit of network management may be identified based on current location information of a specific UE or may be determined based on future location information.

As another embodiment, exposure of renewable energy ratio information will be described. The renewable energy ratio is, for example, the ratio of the amount of power used by renewable energy to the total amount of power used by the dedicated communication service in a certain unit of time. It is proposed that the renewable energy ratio be made available to third parties in order to utilize renewable energy wherever possible. Regarding the granularity of information exposure regarding renewable energy, for example, UE-level information exposure may be considered in order to confirm the amount of renewable energy used by a specific UE in relation to a communication service. Information disclosure can be provided on a periodic, request-based, or threshold-based basis.

In the communication system shown in FIGS. 1A and 1B, the NWDAF 11*k* can provide renewable energy ratio analytics through one-time reporting or continuous reporting to consumer.

The renewable energy ratio information includes renewable energy ratio analysis. The renewable energy ratio analysis is, for example, information indicating a single renewable energy ratio or an analysis result using statistics of the renewable energy ratio. The purpose and method of analysis does not matter. Renewable energy ratio analysis includes, for example, information indicating temporal changes in the renewable energy ratio in a certain time range (values of individual ratios, average values, median values, etc.), information indicating the renewable energy ratio exceeded a predetermined value (threshold value) in a certain time range or information indicating the number of times the renewable energy ratio exceeds the threshold value in a certain time range. The renewable energy ratio is an example of information used for analysis regarding the use of renewable energy, and the renewable energy ratio analysis is an example of information indicating the analysis result regarding the use of renewable energy.

A request for renewable energy ratio analysis related to a particular user (e.g. UE 2) is identified, for example, by the UE ID provided by a consumer. UE ID is identification information that uniquely identifies UE 2 in a network such as 5G. The consumer is a subscriber (user) of a service that provides renewable energy ratio analysis and can send a request for renewable energy ratio analysis. It can also receive renewable energy ratio analysis. However, the requester (request source) of the renewable energy ratio analysis and the user (recipient) of the renewable energy ratio analysis may be the same or different. The consumer (service consumer) may be an existing NF 11 (for example, AF 12 or NEF 11*e*) or a new NF. Moreover, the consumer may be other than NF. In other words, the request source may be a network node within the 5G network or a network node outside the 5G network.

NWDAF 11*k* determines the NF 11 and base station 3A (identified by cell ID, for example) that provide service to the UE 2. NF 11 may be determined, for example, according to the method described in TS 23.288 6.2.2.1. Further, the base station 3A may be determined by the AMF 11*b*, for example.

When a renewable energy ratio analysis consumer subscribes to the service, the consumer can indicate a threshold value. For example, the NWDAF 11*k* may be configured to provide a renewable energy ratio analysis to the consumer when the level of the renewable energy ratio exceeds a threshold value.

Consumer may indicate (include) the following parameters in the request or subscription provided to NWDAF 11*k*.

- Analytics ID: An ID (value) indicating "Analysis of renewable energy ratio" is set.
- Target of analysis report: Information indicating a single UE is set. UE is identified, for example, by a Subscription Concealed Identifier (SUCI).
- Analysis filter information
  - S-NSSAI (Single Network Slice Selection Assistance Information). S-NSSAI is used as an identifier for network slices across 5GC, 5G-RAN, and UE.
  - Location information (Area of Interest).
  - List of requested analysis subsets (optional).
  - Desired level of analysis accuracy (optional).
  - Preferred precision level for each analysis subset (optional).
  - A target period for the analysis indicating the period for which statistics are requested.

FIG. 7A is a table showing data collected from NF and OAM related to renewable energy ratio analysis. For example, the NWDAF 11*k* can collect the information shown in FIG. 7A. The location information of UE 2 is, for example, a location specified by a cell ID, but it is also possible to obtain a cell ID according to future location information of UE 2 using a location prediction function. For example, the future position of UE 2 may be estimated using information indicating geographical position coordinates, and a cell ID may be determined according to the estimated position. The location information of the UE 2 may be information obtained from a network node (NF) within the 5G network, or may be information obtained from outside the 5G network. For example, the location information may be obtained by a location detection application using GPS installed in the UE 2, or location information obtained from a device (for example, a car navigation device) provided in a vehicle in which the UE 2 is mounted. For example, the moving speed and direction of the UE 2 may be calculated from information indicating temporal changes in the position coordinates, and the future position information of the UE 2 may be calculated from these moving speeds and directions. When a car navigation device is used, the location of the vehicle's waypoint or destination and the estimated time of arrival at the waypoint or destination may be used as future position information. Other calculation methods may also be used. In this way, it is possible to obtain a renewable energy ratio analysis based on the base station 3A and NF 11 corresponding to not only the current location information but also the future location information of the UE 2.

FIG. 7B is a table showing an example of renewable energy ratio analysis. The NWDAF 11*k* can transmit (output) the information shown in FIG. 7B, for example, as renewable energy ratio analysis. That is, as a renewable energy ratio analysis, it is possible to output (send) information indicating that the renewable energy ratio satisfies, exceeds, or falls below a threshold value, statistical value, or expected value. For example, the renewable energy ratio can be calculated a predetermined number of times in a certain time unit for a site used by a specific UE 2, and the calculation result can be output as a renewable energy ratio analysis (analysis result). In addition, as a renewable energy ratio analysis for a specific network unit, information indicating the calculation result of the renewable energy ratio for each unit time (including at least one of individual values, average values, and median values) is provided as an analysis result. Moreover, as a renewable energy ratio analysis related to a specific network unit, the renewable energy ratio may be calculated a predetermined number of times in a certain time unit, and the number of times the ratio exceeds or falls below a threshold value may be output. In addition, when a site, a network slice, or one of the NFs (for example, NF) is specified as a unit of network management, ranking (in order of high ratio or in order of low ratio) for multiple UE 2*s* that use the same NF may be created and the ranking may be output as a renewable energy ratio analysis for a specific network unit. Even when the same NF is used, if the base stations are different, the renewable energy of the power used to operate the base stations is different, so the renewable energy ratio differs for each UE. Providing such rankings could be useful in identifying areas with high renewable energy ratios within the network. The same applies when using network slices or sites as a unit of network management instead of NFs. Further, the output as a renewable energy ratio analysis can include at least one of a "list of requested analysis subsets" and a "preferred level of accuracy for each analysis subset".

Figure 8:
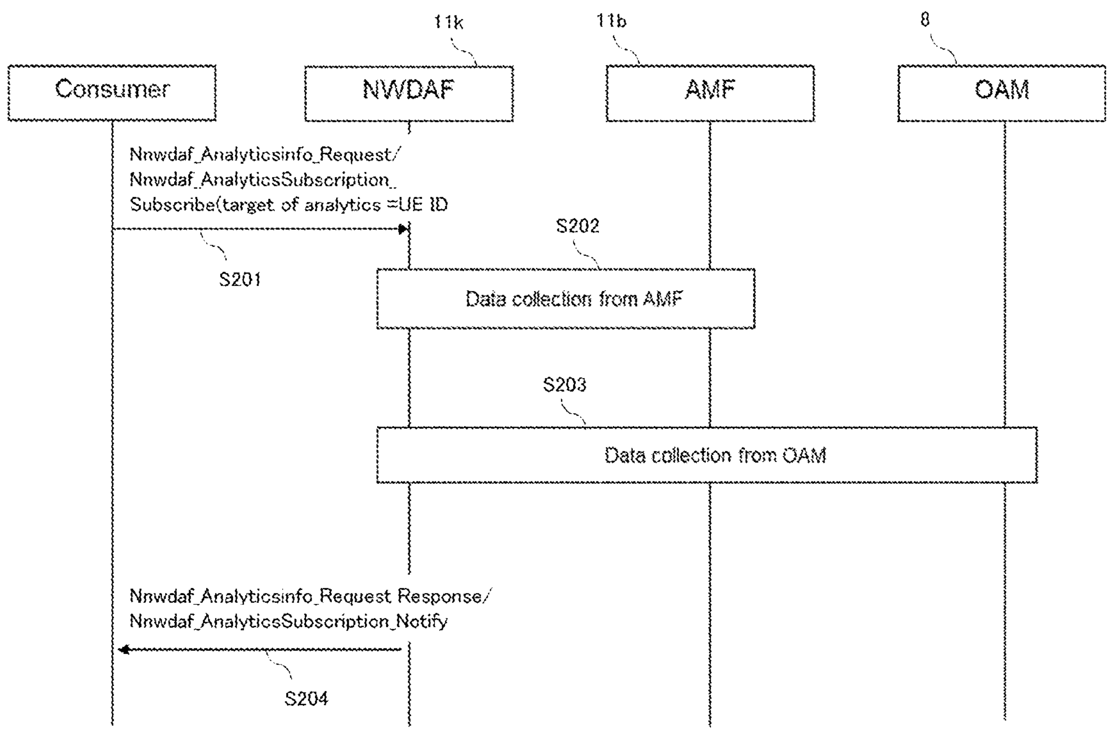
FIG. 8 is a sequence diagram showing an example of the operation of the NWDAF 11*k*.

FIG. 8 is a sequence diagram showing an example of the operation of the NWDAF 11*k*. The operation example is just an example. In step S201 of FIG. 8, consumer (AF 12, etc.) uses the Nnwdaf_AnalyticsInfo Request or Nnwdaf_AnalyticsSubscription_Subscribe service (sends the request or subscription message) to send a request for analytics regarding a specific UE 2 to the NWDAF 11*k*.

In step S202, NWDAF 11*k* acquires the location information of the UE 2 related to the request from AMF 11*b*, and determines the cell ID of the base station 3A that provides the communication service to the UE 2. NWDAF 11*k* may obtain the location information by making an inquiry to the AMF 11*b*, or may obtain the location information by referring to location information sent (received) in advance from the AMF 11*b* or the like.

In step S203, NWDAF 11*k* determines the NF 11 that provides the communication service to the UE 2, and collects from the OAM terminal 8 information on the site to which the determined NF 11 and the base station 3A belong, and information related to the renewable energy of the site. NWDAF 11*k* may obtain the desired information by making an inquiry to the OAM terminal 8, or may obtain the desired information by referring to information sent in advance from the OAM terminal 8. NWDAF 11*k* can calculate the renewable energy ratio for a specific UE 2 from the renewable energy related information of the site and perform analysis using the renewable energy ratio.

In step S204, NWDAF 11*k* provides an answer or notification including the renewable energy ratio analysis to the consumer. That is, NWDAF 11*k* can send a response message to the request message or a notification message to the subscribe message, including the renewable energy ratio analysis. The processing and operations in NWDAF 11*k* described in the other embodiment are performed by the information processing device 20 that operates as NWDAF 11*k*. However, the processing and operation related to the renewable energy ratio analysis of NWDAF 11*k* described in the other embodiment may be performed by a new NF.

In the other embodiment, an information processing apparatus (that is, an information processing apparatus 20 operating as an NWDAF 11*k*) that operates as an NF (Network Function) constituting a cellular network (5G network) receives a request for an analysis regarding the renewable energy ratio for a specific UE 2 from a request source (requester, consumer in this embodiment). The information processing device 20 also transmits information indicating the analysis result of the renewable energy ratio at a site based on the location information of the specific UE 2 (the site to which the NF and base station that provide communication services to the specific UE 2 belong) to a recipient (for example, the consumer). Specifically, NWDAF 11*k* receives a message from a consumer (predetermined requester) such as the AF 12 requesting an analysis regarding the renewable energy ratio of a specific UE 2. NWDAF 11*k* identifies the NF 11 and the base station 3A associated with the specific UE 2, and sends a response message including the renewable energy ratio analysis to the consumer as information indicating the results of the analysis of the renewable energy ratio at the site to which the NF 11 and the base station 3A belong.

In the other embodiment, the information that NWDAF 11*k* acquires in steps S202 and S203 is an example of first information, and the information that the NWDAF 11*k* transmits to the consumer in step S204 is an example of second information. The first information can be acquired based on the above-mentioned current or future location information of the UE 2. Further, the renewable energy ratio analysis described in the other embodiment is an example of second information indicating the analysis result using the first information. The configurations described in the embodiments may be applied to 6G network or the like instead of 5G network.

The above embodiment and modifications are merely illustrative, and the present disclosure can be modified as appropriate without departing from the spirit and scope of the present disclosure. The processes and means described in the present disclosure can be combined as desired as long as no technical contradiction occurs.

The process described as being performed by a single device may be performed in a distributed manner by a plurality of devices. Alternatively, the processes described as being performed by different devices may be performed by a single device. In a computer system, the hardware configuration (server configuration) that implements functions can be flexibly changed.

The present disclosure can also be implemented by supplying computer programs that implement the functions described in the above embodiment to a computer and causing one or more processors of the computer to read and execute the computer programs. Such computer programs may be provided to the computer by a non-transitory computer-readable storage medium that can be connected to a system bus of the computer, or may be provided to the computer via a network. Examples of the non-transitory computer-readable storage medium include: any type of disk or disc such as a magnetic disk (floppy (registered trademark) disk, hard disk drive (HDD), etc.) and an optical disc (compact disc read-only memory (CD-ROM), digital versatile disc (DVD), Blu-ray disc, etc.); and any type of medium suitable for storing electronic instructions such as a read-only memory (ROM), a random access memory (RAM), an erasable programmable read-only memory (EPROM), an electrically erasable programmable read-only memory (EEPROM), a magnetic card, a flash memory, and an optical card.

What is claimed is:

1. A method comprising:

receiving a request from a requester for an analysis of the use of renewable energy in relation to a specific unit of network management in a network; and sending information indicating analysis results of the use of renewable energy to the requester, wherein the requester is an Application Function (AF) or a Network Function (NF) in the network, and wherein the specific unit of network management is a specific Protocol Data Unit (PDU) session, a specific User Equipment (UE), or a specific network slice.

2. The method according to claim 1, wherein the specific unit of network management is the specific network slice or the specific PDU session.

3. The method according to claim 1, wherein the specific unit of network management is identified based on location information of a specific UE.

4. An apparatus comprising one or more hardware processors configured to:

receive a request from a requester for an analysis of the use of renewable energy in relation to a specific unit of network management in a network; and transmit information indicating the results of analysis regarding the use of renewable energy to the requester, wherein the requester is an Application Function (AF) or a Network Function (NF), and wherein the specific unit of network management is a specific Protocol Data Unit (PDU) session, a specific User Equipment (UE), or a specific network slice.

5. The apparatus of claim 4, wherein the specific unit of network management is the specific network slice or the specific PDU session.

* * * * *